United States Patent [19]

Sasaki et al.

[11] Patent Number: 4,756,403
[45] Date of Patent: Jul. 12, 1988

[54] DEVICE FOR LOWERING AND LIFTING CONTAINERS

[75] Inventors: Hiromichi Sasaki; Toshikazu Nakayama, both of Yokohama, Japan

[73] Assignee: Karin Beer Kabushiki Kaisha, Yokahama, Japan

[21] Appl. No.: 113,290

[22] Filed: Oct. 26, 1987

Related U.S. Application Data

[63] Continuation of Ser. No. 827,232, Feb. 7, 1986, abandoned, which is a continuation of Ser. No. 617,347, Jun. 5, 1984, abandoned.

[30] Foreign Application Priority Data

Jun. 10, 1983 [JP] Japan .................. 58-88692

[51] Int. Cl.$^4$ .................................. B65G 33/00
[52] U.S. Cl. .................. 198/724; 198/339.1; 198/437; 198/441
[58] Field of Search .............. 198/339.1, 724, 778, 198/437, 441, 480.1, 481.1

[56] References Cited

U.S. PATENT DOCUMENTS

| | | | |
|---|---|---|---|
| 1,402,488 | 1/1922 | Fooks | 198/724 X |
| 1,422,798 | 7/1922 | Thompson | 198/724 X |
| 1,892,206 | 12/1932 | Dietz | 198/724 |
| 2,628,708 | 2/1953 | Wahl et al. | 198/724 |
| 4,467,908 | 8/1984 | Schneider | 198/441 |
| 4,479,582 | 10/1984 | Ducloux | 198/437 X |

Primary Examiner—Robert J. Spar
Assistant Examiner—D. Glenn Dayoan
Attorney, Agent, or Firm—Ladas & Parry

[57] ABSTRACT

The device has a rotary drum provided with a plurality of guide recesses, an outer cylindrical plate surrounding the rotary drum and a helical bar disposed between the outer peripheral surface of the drum and the plate. Containers are lowered and lifted along the bar while being moved up and down in the respective guide recesses.

9 Claims, 4 Drawing Sheets

DEVICE FOR LOWERING AND LIFTING CONTAINERS

This is a continuation of co-pending application Ser. No. 827,232 filed on Feb. 7, 1986 now abandoned, which is a continuation of U.S. Ser. No. 617,347 filed June 5, 1984 (now abandoned).

BACKGROUND OF THE INVENTION

This invention relates to a device for continuously lowering and lifting containers such as bottles, cans or the like.

In general, an inclined conveyor-type device was conventionally used as a device for lowering containers such as bottles or cans from a high level to a low level and lifting them from a low level to a high level. In case the inclined conveyor is used for such a purpose, it is not desirable to incline the conveyor at more than 4 degrees for preventing the containers from falling down.

As a kind of such a device, the inventors of this invention formerly invented a slide-type device for lowering and lifting bottle-like containers. This slide-type device was disclosed in Japanese Utility Laid-Open Publication No. 72807/1981. The slide-type device has a slide on which a plurality of bottles slide down in a state wherein the bottles adjacent to one another incline downward with the bottom surface of each bottle contacting the sliding surface of the slide. The lower part of the slide is provided with a stopper for regularly feeding each bottle one by one to the next process.

The slide extends straight in a inclined state and the inclination angle of the slide is limited to such an extent as to prevent the bottles from falling down on the slide.

Accordingly, in both cases of the conveyor-type and slide-type devices, it will be obliged to use a remarkably long device, which is inconvenient and not economical.

SUMMARY OF THE INVENTION

It is an object of this invention to provide a device for lowering and lifting containers such as bottles, cans or the like, which device is capable of lowering and lifting the containers speedily in a narrow space and has a simple construction.

According to this invention, there is provided a device for lowering and lifting containers such as bottles, cans or the like in which the containers are slid up and down on guide means disposed between an upper container conveying means and a lower container conveying means, characterized by comprising: a rotary drum provided with a plurality of guide recesses at its peripheral surface each of which extends longitudinally of the drum in order to guide each container therealong; an outer cylindrical plate surrounding the rotary drum so as to form predetermined spaces each suitable for slidably holding each container between the plate and each guide recess of the drum; and a guide bar disposed helically between the peripheral surface of the drum and the inner surface of the outer cylindrical plate and extending from an inlet of the device formed adjacent to one container conveying means to an outlet of the device formed adjacent to the other container conveying means, each container sliding up and down on the bar while moving up and down along each guide recess of the drum in accordance with the rotation of the drum.

The nature, utility, and further features of this invention will be more clearly apparent from the following detailed description with respect to preferred embodiments of the invention when read in conjunction with the accompanying drawings briefly described below.

DETAILED DESCRIPTION OF THE INVENTION

Figure 1:
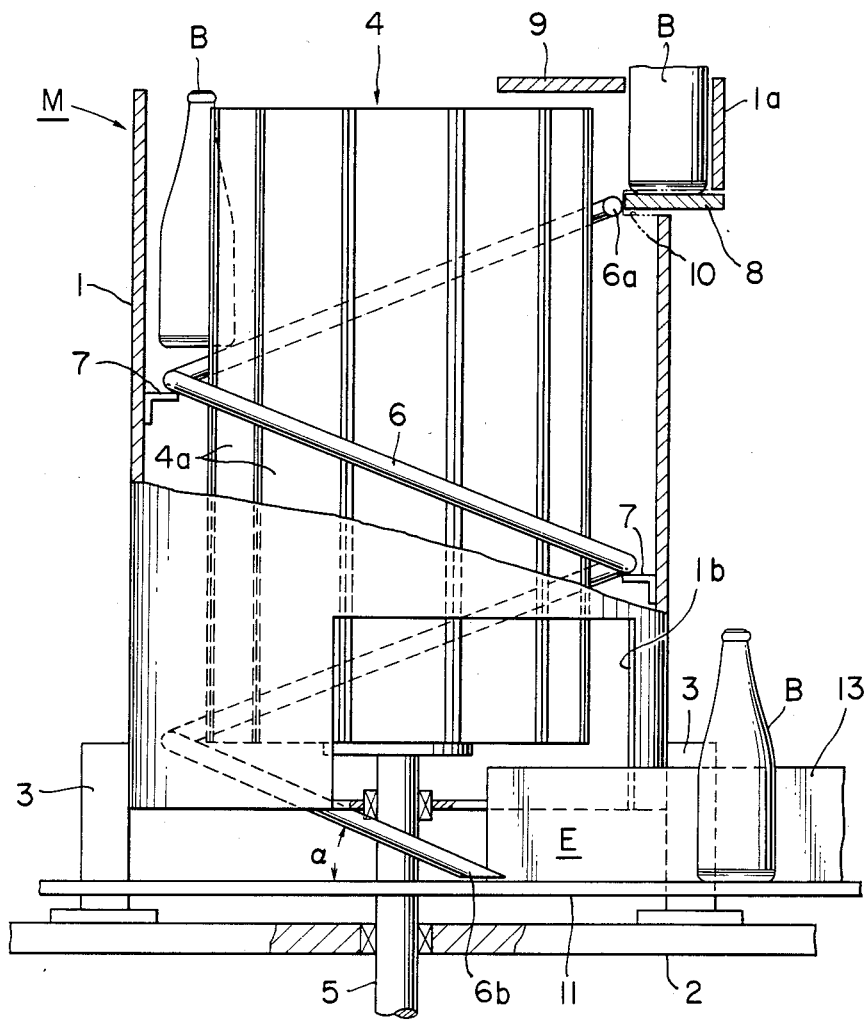
FIG. 1 is a front elevational view, with parts cut away and parts in vertical section, showing a device for lowering and lifting containers according to this invention.
Figure 2:
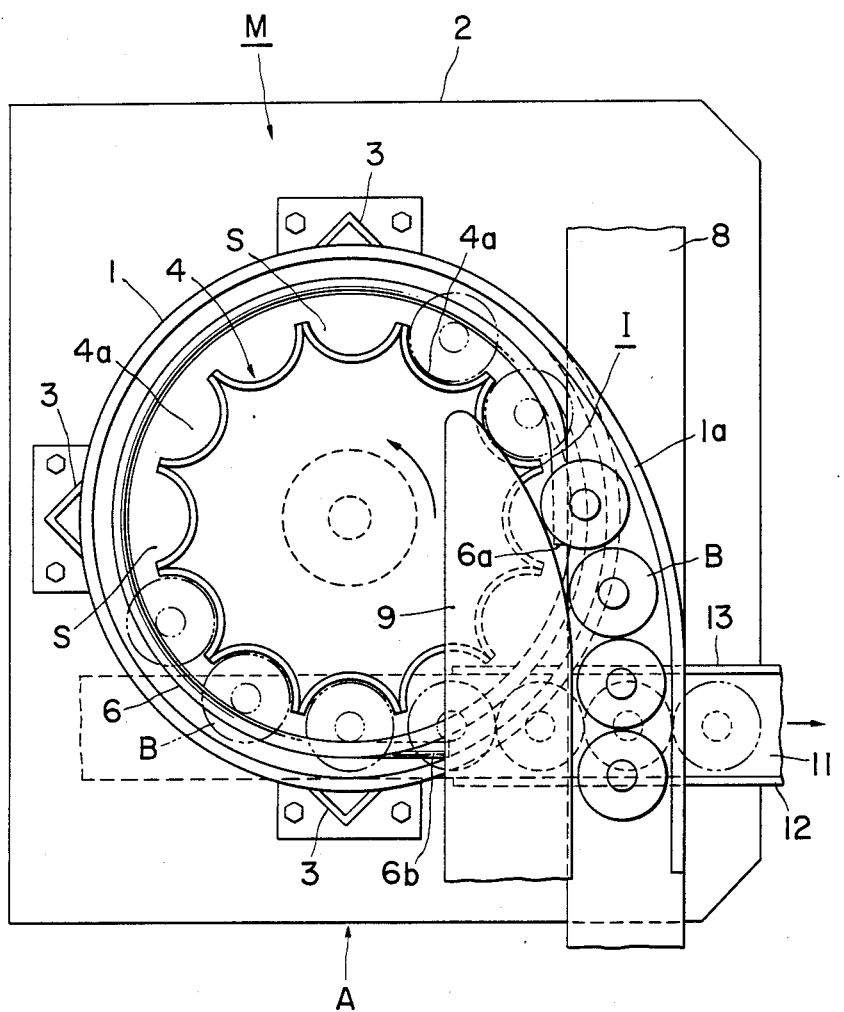
FIG. 2 is a plan view of the device shown in FIG. 1.

In FIGS. 1 and 2, a device M of this invention for lowering and lifting bottle-like containers B has an outer cylindrical plate or guide means 1 which is fixed to a base 2 through a plurality of fixing plates 3. In the outer plate 1 is disposed a rotary drum 4 supported by a rotatable axis 5. The drum 4 has a plurality of arcuate recesses or grooves 4a adjacent to one another in cross section at its periphery. Each recess 4a has a radius of curvature slightly larger than that of each container B and forms approximately a half circle in cross section. Furthermore, each recess 4a extends almost vertically so as to form a longitudinal space S slightly larger than that of diameter of each container B between each recess 4a and the outer cylindrical plate 1.

In the annular space between the drum 4 and the outer cylindrical plate 1 is provided a helical guide bar or inclined support means 6 which is supported by a plurality of brackets 7 fixed to the inner peripheral surface of the outer cylindrical plate 1. The upper end 6a of the bar 6 is disposed adjacent to the side face of an upper conveyor 8 which conveys continuously containers B from a former process. The upper conveyor 8 extends tangentially of the annular space between the drum 4 and the outer cylindrical plate 1. The upper portion of the plate 1 is provided with a guide portion 1a extending over and across the upper conveyor 8. The guide portion 1a defines a guide path for the containers B together with a guide plate 9 opposite to the guide portion 1a. Each container B rides on the upper end 6a of the bar 6 in an inlet I of the device M. The upper conveyor 8 passes through a slit 10 (FIG. 1) formed in a root portion of the guide portion 1a.

The lower end 6b of the bar 6 is located in an outlet E over a lower conveyor 11 extending perpendicular to the upper conveyor 8 and tangentially of the outer cylindrical plate 1. The lower end of the plate 1 is partially cut away to form an opening 1b through which each container B lowered from the inlet I to the outlet E passes while riding on the lower conveyor 11. Furthermore, along the lower conveyor 11 are respectively disposed two guide plates 12, 13 for guiding the containers B.

Immediately after each container B conveyed by the upper conveyor 8 has ridden on the upper end 6a of the helical guide bar 6 in the inlet I, the container B is accommodated in one of the recesses 4a. In accordance with the rotation of the drum 4 which rotates counterclockwise as viewed in FIG. 2, each container B is lowered in a manner that the bottom of the container B slides down on the bar 6. At this time, each container B is lowered in the space S in its upright state. In this manner, the container B is guided to the outlet E to ride on the lower conveyor 11.

The drum 4 is made of plastic material or the like and the bar 6 is made of metal or the like.

The inclination angle $\alpha$ of the bar 6 can be freely selected. Even if its inclination angle is remarkably large, each container B can be lowered smoothly because the container B is steadily kept in the space S. Moreover, in this embodiment, the upper and lower conveyors 8, 11 extend tangentially of the outer cylindrical plate 1. However, the two conveyors 8, 11 can be disposed in various directions therefrom.

The drum 4 may be adapted to be driven by a motor (not shown) through the rotating axis 5 in synchronism with the speed of the two conveyors 8, 11. However, the drum 4 may be adapted to rotate freely without provision of the motor so as to permit the drum 4 to rotate under the pressure of the container B (line pressure) conveyed by the upper conveyor 8.

In this device M, as containers B are adapted to be lowered along the helical guide bar 6 in the state wherein the containers B stand upright in the respective spaces S, a large space is not necessary to lower the containers B from a high level to a low level. In addition, the containers B can be lowered speedily without falling down from the guide bar 6.

In the above embodiment, the device M is used as a device for only lowering the containers B from a high level to a low level. However, the device M can be used for lifting the containers B from a low level to a high level. In this case, the containers B are fed into the outlet E by the lower conveyor 11 which runs in the direction opposite to an arrow direction shown in FIGS. 1 and 2 and the drum 4 is rotated clockwise by the motor as viewed in FIG. 2. In addition, the upper conveyor 8 runs in the direction opposite to an arrow direction shown in FIG. 2 for discharging the containers B lifted by the device M through the inlet I.

In case the device M is used as a container lowering device in which the drum 4 is adapted to be freely rotated under pressure of the containers B conveyed by the upper conveyor 8, the drum 4 is apt to rotate at a remarkably high speed. In such a case, the rotatable axis 5 may be controlled by frictional means (not shown).

Figure 5:
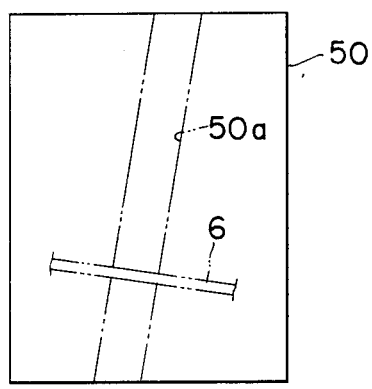
FIG. 5 is a front elevational view of another drum.

Furthermore, in FIG. 1, the recesses 4a extend vertically. However, in case the device M is used especially as a container lifting device, if a plurality of recesses 50a are formed on a drum 50 so as to be inclined in a direction (as shown, about 10° from the vertical) perpendicular to the direction in which the guide bar 6 extends as shown in FIG. 5, the friction between the guide bar 6 and the bottom surface of each container B is reduced thereby to decrease the driving force of the motor for rotating the drum 50.

Figure 6:
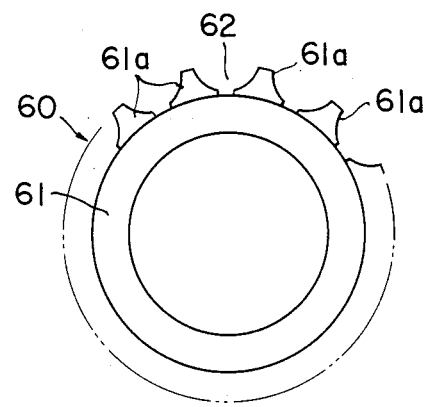
FIG. 6 is a plan view of still another drum.

FIG. 6 shows another drum 60 which has a cylindrical main body 61 and a plurality of slender pieces 61a attached to the peripheral surface of the drum 60 so as to form a plurality of longitudinal recesses 62. In this manner, a plurality of longitudinal recesses can be formed on a rotary drum in various ways.

The device M of this invention can be adapted to various kinds of apparatuses for dealing with bottles or cans as well as the above embodiment.

Figure 3:
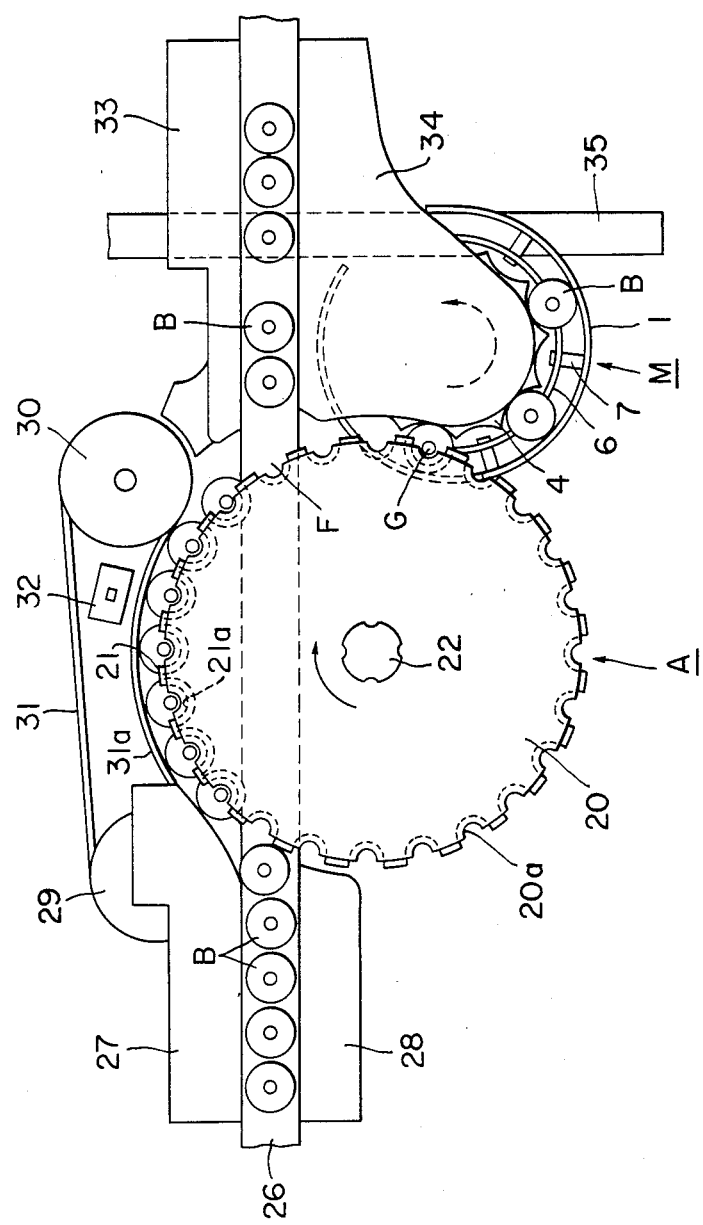
FIG. 3 is a plan view of container inspecting apparatus to which the device of this invention is adapted.
Figure 4:
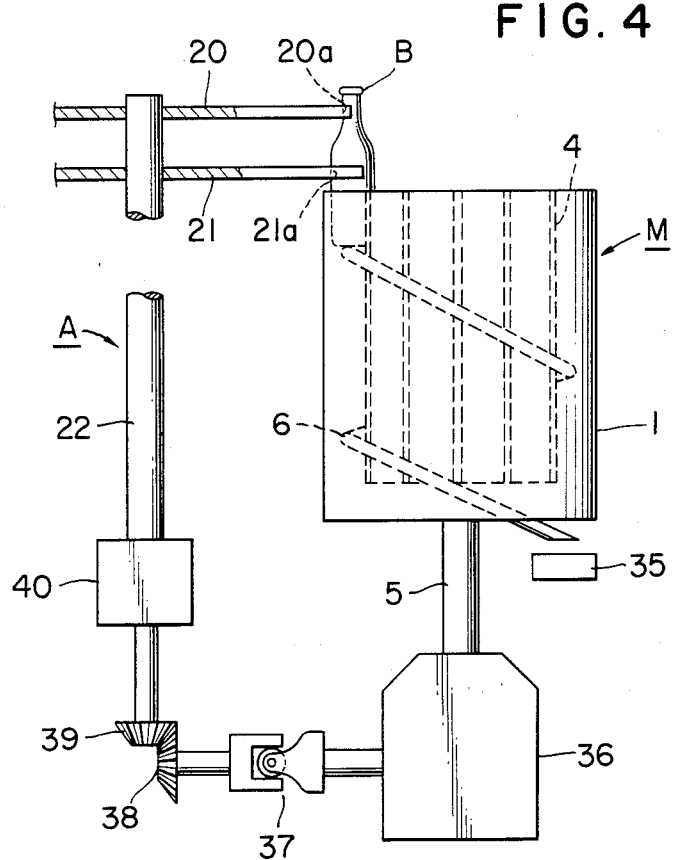
FIG. 4 is a front elevational view showing a state wherein the drum of the device of this invention is associated with two star wheels for transferring the containers.

FIGS. 3 and 4 show a container inspecting apparatus A to which the device M of this invention is adapted. The bottle inspecting apparatus A has two star wheels 20, 21 fixed to the same rotating axis 22 at two different levels. The upper wheel 20 has a plurality of arcuate recesses 20a which are provided along the periphery thereof at equal space intervals in order to support the necks of respective bottlelike containers B while the lower wheel 21 is also provided with a plurality of arcuate recesses 21a which are provided along the periphery thereof so as to register with the recesses 20a of the upper wheel 20, respectively, in order to support the bodies of respective containers B.

The containers B are fed continuously by an upper conveyor 26 extending under the lower star wheels 21 in the lateral direction as viewed in FIG. 3. On the upstream side of the star wheels 2, 3 are provided, along the upper conveyor 6, two guide members 27, 28 for preventing the containers B from falling down therefrom. There are provided two spaced-apart pulleys 29, 30 outside the star wheels 20, 21 along the peripheries thereof. A belt 31 runs between two pulleys 29, 30 in accordance with the travelling of each container B held in the recesses 20a, 21a of the star wheels 20, 21. The inner running portion 31a of the belt 31 pushes each container B into the respective recesses 20a, 21a.

To hold the respective containers B in the corresponding recesses 20a, 21a, a plurality of container holding means (not shown) such as suction cups for holding the body of each of the containers B are provided around the rotating axis 22.

Between the two pulleys 29, 30 is disposed an optical inspecting device 32 for inspecting defects of the containers B.

On the opposite sides of the upper conveyor 16 in the downstream position with respect to the star wheels 20, 21 are provided two guide members 33, 34 for guiding flawless containers B to the next process. Under the guide member 34 and adjacent to the wheels 20, 21 is provided the device M of this invention for lowering defective containers onto a lower conveyor 35 extending perpendicular to the upper conveyor 26 in a position lower than that of the upper conveyor 26.

In this case, the rotating axis 5 of the device M is connected to the rotating axis 22 of the apparatus A through a gear box 36, a joint 37, bevel gears 38, 39 and another gear box 40. That is, the drum 4 is rotated synchronously with the wheels 20, 21.

On the upstream side of the star wheels 20, 21, the containers B are fed at predetermined space intervals into the respective recesses 20a, 21a of the wheels 20, 21. Then, the containers B are moved along the arcuate travelling path in a state that the containers B are held in the recesses 20a, 21a by the container holding means. When each of the containers B passes in front of the optical inspecting device 32, the container B is inspected by the device 32 as to whether it is defective or flawless. If the container B is flawless, the optical inspecting device 32 transmits a signal to the container holding device so that it releases the container B at a position F over the upper conveyor 26 to cause the container B to ride on the upper conveyor 26. On the contrary, if the container B is defective, the container holding means releases the container B at a position G in accordance with a signal from the optical inspecting device 32 thereby to cause the container B to ride on the upper end of the helical guide bar 6. The container B fed into the upper portion of the device M of this invention is then lowered in accordance with the rotation of the drum 4 until it rides on the lower conveyor 35.

We claim:

1. A device for lowering and lifting containers such as bottles, cans or the like in which the containers are slid up and down on inclined support means disposed between an upper container conveying means and a lower container conveying means, said device comprising:

a rotary drum rotatable about a vertical axis and having a plurality of guide recesses at its peripheral surface, each of which extends longitudinally of the drum in order to guide each container therealong;

outer cylindrical guide means surrounding the rotary drum in spaced relationship thereto so as to form predetermined spaces in conjunction with said guide recesses, each said space being suitable for slidably holding each container between the outer guide means and each guide recess of the drum; and inclined support means disposed helically between the peripheral surface of the drum and the inner surface of the outer guide means and extending from an inlet of the device formed adjacent to one container conveying means to an outlet of the device formed adjacent to the other container conveying means, whereby each container slides up and down on the inclined guide means while moving up and down along each guide recess of the drum in accordance with the rotation of the drum, said guide recesses being inclined from the vertical so as to extend in a direction substantially perpendicular to the inclined support means.

2. A device according to claim 1, wherein the drum is rotatably supported by a base via a rotatable axis, the inlet being formed in the upper part of the device while the outlet being formed in the lower part of the device, the drum being rotated under the pressure of each container fed by the upper conveying means into the inlet while lowering each container.

3. A device according to claim 1, wherein the drum is rotated by driving means, the inlet being formed in the lower part of the device while the outlet being formed in the upper part of the device, the drum being driven by the drive means while lifting each container from the inlet to the outlet along the inclined support means.

4. A device according to claim 1, wherein the drum has a cylindrical main body and a plurality of pieces attached to the peripheral surface of the main body for forming the respective guide recesses.

5. A device according to claim 1, which comprises horizontally spaced guide plates positioned for guiding the containers from the lower conveying means in a tangential direction into the annular space between the drum and the outer cylindrical guide means, whereby a recess on the drum engages each container while supported on the inclined support means.

6. A device according to claim 1, in which the outer cylindrical guide means is a cylindrical plate and the inclined support means is a bar shaped in the form of a helix.

7. A device according to claim 5, in which the outer cylindrical guide means is a cylindrical plate and the inclined support means is a bar shaped in the form of a helix.

8. The combination of a device according to claim 5 and a lower conveying means and an upper conveying means, said lower conveying means supplying containers in a tangential direction to the annular space between the drum and the outer cylindrical guide means adjacent the inclined support means at the inlet of the device and the upper container conveying means being positioned to receive containers at the outlet of the device and including a pair of horizontally spaced guide plates to guide said containers discharged at said exit end in a tangential direction from the annular space between the drum and the outer cylindrical guide means at the exit of the device into said upper conveying means.

9. A device according to claim 1, in which the guide recesses extend at an angle of about 10° from the vertical.

* * * * *

UNITED STATES PATENT AND TRADEMARK OFFICE
CERTIFICATE OF CORRECTION

PATENT NO. : 4,756,403

DATED : July 12, 1988

INVENTOR(S) : Hiromichi SASAKI ET AL

It is certified that error appears in the above-identified patent and that said Letters Patent is hereby corrected as shown below:

Title Page, Item [73] which reads "Karin" should read-- Kirin--.

Signed and Sealed this

Sixth Day of December, 1988

Attest:

DONALD J. QUIGG

Attesting Officer

Commissioner of Patents and Trademarks